US006476686B1

(12) United States Patent
Fiedziuszko et al.

(10) Patent No.: US 6,476,686 B1
(45) Date of Patent: Nov. 5, 2002

(54) DIELECTRIC RESONATOR EQUALIZER

(75) Inventors: Slawomir J. Fiedziuszko, Palo Alto, CA (US); George A. Fiedziuszko, San Jose, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/957,734

(22) Filed: Sep. 21, 2001

(51) Int. Cl.[7] .............................. H04B 3/04; H01P 7/10

(52) U.S. Cl. .................. 333/28 R; 333/202; 333/219.1; 333/230; 333/219; 333/212

(58) Field of Search ............................... 333/28 R, 219, 333/219.1, 212, 209

(56) References Cited

U.S. PATENT DOCUMENTS

| | | | | | |
|---|---|---|---|---|---|
| 3,900,806 | A | * | 8/1975 | Caroli | 333/156 |
| 4,489,293 | A | * | 12/1984 | Fiedziuszko | 333/202 |
| 4,540,955 | A | * | 9/1985 | Fiedziuszko | 333/212 |
| 4,622,523 | A | * | 11/1986 | Tang | 333/208 |
| 4,630,009 | A | * | 12/1986 | Tang | 333/212 |
| 5,027,090 | A | * | 6/1991 | Gueble et al. | 333/202 |
| 5,136,268 | A | * | 8/1992 | Fiedziuszko et al. | 333/204 |
| 5,172,084 | A | * | 12/1992 | Fiedziuszko et al. | 333/204 |
| 5,172,984 | A | * | 12/1992 | Lederman | 384/489 |
| 5,708,404 | A | * | 1/1998 | Kirisu et al. | 333/202 |
| 5,760,667 | A | * | 6/1998 | Young et al. | 333/212 |
| 5,990,765 | A | * | 11/1999 | Mansour et al. | 333/204 |
| 6,297,715 | B1 | * | 10/2001 | Fiedziuszko et al. | 333/202 |

* cited by examiner

*Primary Examiner*—Michael Tokar
*Assistant Examiner*—Lam T. Mai
(74) *Attorney, Agent, or Firm*—Kenneth W. Float

(57) ABSTRACT

An equalizer that couples a dual-mode dielectric resonator to a planar transmission line, creating an all-pass network. Coupling is achieved using circular polarization of the electromagnetic field in the dielectric resonator. The all-pass, non-reciprocal network is realized by the use of circular polarized energy and an offset cross shaped, through transmission line.

9 Claims, 1 Drawing Sheet

DIELECTRIC RESONATOR EQUALIZER

BACKGROUND

The present invention relates generally to an equalizer, and more particularly, to an improved dielectric resonator equalizer that does not employ circulators.

The assignee of the present invention manufactures and deploys satellites that orbit the earth and which carry communication equipment. Equalizers are employed as part of the communication equipment. Conventional equalizers include a reflective equalizer using circulator or a self equalized filter. However, circulators are problematic in that they exhibit temperature stability and isolation problems.

It would therefore be advantageous to have a dielectric resonator equalizer that does not employ circulators.

SUMMARY OF THE INVENTION

To meet the above and other objectives, the present invention comprises a dielectric resonator equalizer that couples a dual-mode dielectric resonator to a planar transmission line, creating an all-pass network. Coupling is achieved using circular polarization of the electromagnetic field in the dielectric resonator. The all-pass, non-reciprocal network is realized by the use of circular polarized energy and an offset cross shaped, through transmission line.

An exemplary dielectric resonator equalizer comprises a cavity having first and second orthogonal tuning screws extending through its wall into the interior thereof and first and second opposed mode decoupling screws 14, 15 extending through the wall into the interior thereof.

A dual-mode dielectric resonator is disposed in the cavity. Input and output connectors are disposed at opposite ends of the cavity and are coupled to a transmission line that is disposed in the cavity. The transmission line has an offset cross shape. An aperture coupling or iris is disposed in the cavity between the transmission line and the dual-mode dielectric resonator.

A second dual-mode dielectric resonator may also be disposed in the cavity that is separated from and coupled to the dual-mode dielectric resonator by way of a second aperture coupling or iris.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
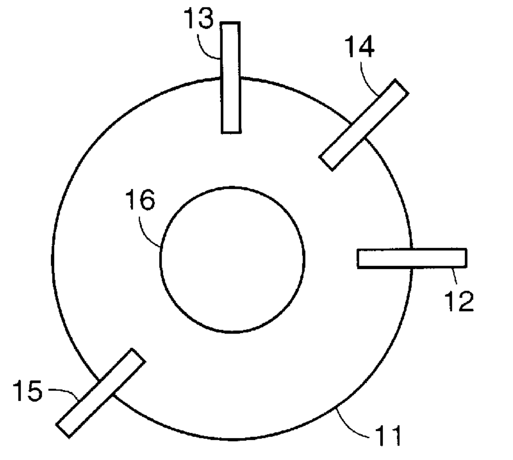
FIG. 1 illustrates a cross-sectional top view of an exemplary dielectric resonator equalizer in accordance with the principles of the present invention.

Referring to the drawing figures, FIG. 1 illustrates a cross-sectional top view of an exemplary dielectric resonator equalizer 10 in accordance with the principles of the present invention. The dielectric resonator equalizer 10 comprises a cavity 11 including first and second orthogonal tuning screws 12, 13 that extend through a wall of the cavity 11 into the interior thereof.

First and second opposed mode decoupling screws 14, 15, are provided that also extend through the wall of the cavity 11 into the interior thereof. A dual-mode dielectric resonator 16 is disposed in the cavity 11.

Figure 2:
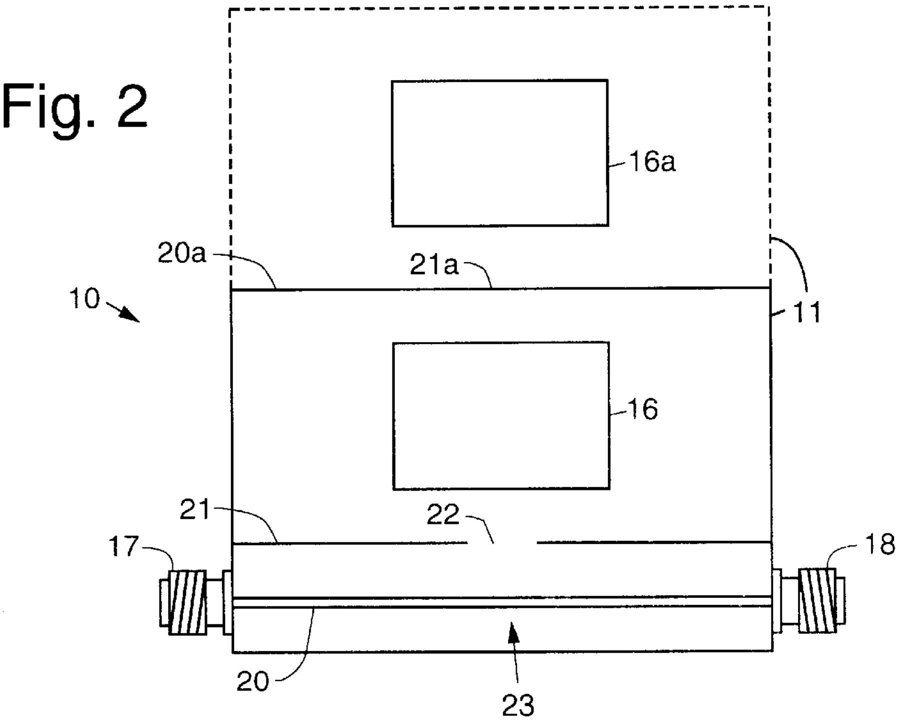
FIG. 2 is a cross-sectional side view of the dielectric resonator equalizer.

FIG. 2 is a cross-sectional side view of the dielectric resonator equalizer 10. As is shown in FIG. 2, input and output connectors 17, 18 are disposed at opposite ends of the cavity 11 and are coupled to a transmission line 20. An aperture coupling 21 or iris 21 having an aperture 22 is disposed in the cavity 11 between the transmission line 20 and the dual-mode dielectric resonator 16. FIG. 2 also shows that the aperture 22 is located under the dual-mode dielectric resonator 16 and generally is centered with respect thereto.

Figure 3:
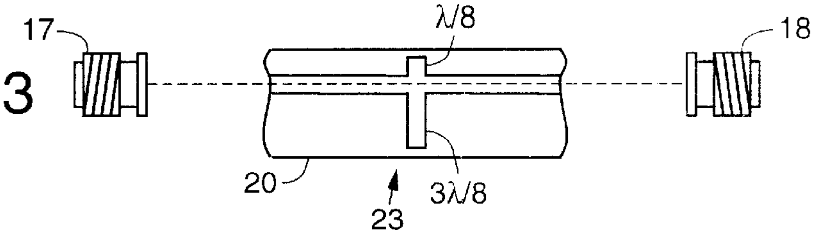
FIG. 3 illustrates details of a transmission line used in the dielectric resonator equalizer.

FIG. 3 illustrates details of a transmission line 20 used in the dielectric resonator equalizer 10. FIG. 3 shows a top view of the transmission line 20. The transmission line 20 interconnects the input and output connectors 17, 18.

The transmission line 20 may be a stripline or a microstrip transmission line 20. The transmission line 20 has an offset cross member 23 having a length of$\lambda/8$ on one side of the transmission line 20 and a length of $3\lambda/8$ on the opposite side of the transmission line, where is the wavelength of energy coupled into the dielectric resonator equalizer 10. The dual-mode dielectric resonator 16 is coupled to the cross shaped transmission line 20 in a manner that excites a circularly polarized electromagnetic field in the dielectric resonator 16.

The dielectric resonator equalizer 10 exhibits an all-pass transfer function. Coupling, which is required to realize the all pass transfer function of the equalizer 10 is controlled by the distance between the transmission line 20 and the dual-mode dielectric resonator 16. Additional adjustment is obtained by suitably configuring the aperture coupling 21 or iris 21.

A single dual-mode dielectric resonator 16 forms a C-section (1 pole of equalization) and two coupled dual-mode resonators **16, 16*a* (the second resonator 16*a* is illustrated in dashed lines) create a D-section (2 poles of equalization). The two dual-mode resonators 1616, 16*a* may be coupled by way of a second aperture coupling 21*a* or iris 21*a* disposed between the dual-mode resonators 16, 16*a***.

An all-pass, non-reciprocal network is realized by the use of circular polarization and offset cross shaped, through transmission line 20. Problematic circulators (having temperature stability and isolation problems) are therefore not required in implementing the dielectric resonator equalizer 10.

Thus, an improved dielectric resonator equalizer has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A dielectric resonator equalizer comprising:

a cavity;

first and second orthogonal tuning screws that extend through a wall of the cavity into the interior thereof;

first and second opposed mode decoupling screws that extend through the wall of the cavity into the interior thereof;

a dual-mode dielectric resonator disposed in the cavity;

input and output connectors disposed at opposite ends of the cavity;

a transmission line comprising an offset cross member disposed in the cavity and coupled to the input and output connectors;

an aperture coupling disposed in the cavity between the transmission line and the dual-mode dielectric resonator.

2. The dielectric resonator equalizer recited in claim 1 wherein the transmission line is a stripline transmission line.

3. The dielectric resonator equalizer recited in claim 1 wherein the transmission line is a microstrip transmission line.

4. The dielectric resonator equalizer recited in claim 1 wherein the offset cross member has a length of $\lambda/8$ on one side of the transmission line and a length of $3\lambda/8$ on the opposite side of the transmission line, where is the wavelength of energy coupled into the equalizer.

5. The dielectric resonator equalizer recited in claim 1 wherein the dual-mode dielectric resonator is coupled to the cross shaped transmission line in a manner that excites a circularly polarized electromagnetic field in the dielectric resonator.

6. The dielectric resonator equalizer recited in claim 1 wherein the dielectric resonator equalizer exhibits an all-pass transfer function.

7. The dielectric resonator equalizer recited in claim 1 wherein coupling required to realize the all pass transfer function of the equalizer is controlled by the distance between the transmission line and the dual-mode dielectric resonator.

8. The dielectric resonator equalizer recited in claim 7 wherein additional coupling is provided by configuring the aperture coupling in a desired manner.

9. The dielectric resonator equalizer recited in claim 1 further comprising a second dual-mode resonator 16*a* disposed in the cavity that coupled to the dual-mode resonator 16 by way of a second aperture coupling disposed therebetween.

* * * * *